United States Patent [19]

Horton et al.

[11] Patent Number: 5,049,164

[45] Date of Patent: Sep. 17, 1991

[54] MULTILAYER COATED ABRASIVE ELEMENT FOR BONDING TO A BACKING

[75] Inventors: Ralph M. Horton, Murray; Royce A. Anthon, W. Jordan, both of Utah; James T. Hoggins, Plano, Tex.

[73] Assignee: Norton Company, Worcester, Mass.

[21] Appl. No.: 461,387

[22] Filed: Jan. 5, 1990

[51] Int. Cl.⁵ .............................................. B24B 1/00
[52] U.S. Cl. ....................................... 51/295; 51/293; 51/298; 51/309
[58] Field of Search ................... 51/293, 295, 298, 309

[56] References Cited

U.S. PATENT DOCUMENTS

| | | | |
|---|---|---|---|
| 4,268,276 | 5/1981 | Borenkerk | 51/295 |
| 4,298,356 | 11/1981 | Teschner et al. | 51/298 |
| 4,311,489 | 1/1982 | Kressner | 51/298 |
| 4,441,894 | 4/1984 | Sarin et al. | 51/295 |
| 4,449,989 | 5/1984 | Sarin et al. | 51/295 |
| 4,469,489 | 9/1984 | Sarin et al. | 51/295 |
| 4,576,612 | 3/1986 | Shukla et al. | 51/295 |
| 4,629,473 | 12/1986 | Ruid et al. | 51/298 |
| 4,776,863 | 10/1988 | Van der Berg et al. | 51/295 |

Primary Examiner—William R. Dixon, Jr.
Assistant Examiner—Willie J. Thompson
Attorney, Agent, or Firm—Weil, Gotshal & Manges

[57] ABSTRACT

To prevent thermal stress from damaging a PCD or diamond, multilayer metal coatings for bonding polycrystalline diamond compacts and diamond crystals to a matrix comprise a first metal layer of a refractory metal, such as tungsten, a compliant metal layer of copper, and an outer metal layer of a refractory metal such as tungsten. Metallic bonding layers of a metal, such as nickel, are placed between the tungsten and copper layers for improved bonding. The method of manufacturing multilayer metal coatings comprises applying the inner metal layer by chemical vapor deposition, applying the first bonding layer metal by electrolytic deposition, applying the compliant layer metal by electrolytic deposition, applying the second bonding layer by electrolytic deposition and applying the outer layer by chemical vapor deposition. A superabrasive tool element comprises a coated diamond product bonded either to a matrix comprising tungsten carbide or iron powder or to a cemented tungsten carbide support.

44 Claims, 6 Drawing Sheets ent invention, additional metal layers may be included
MULTILAYER COATED ABRASIVE ELEMENT FOR BONDING TO A BACKING

FIELD OF INVENTION

This invention relates to diamond or other superabrasive or wear-resistant elements which are bonded to a backing by means of a multilayer metal coating for preventing cracking of the diamond or other superabrasive or wear-resistant element when bonded to such backing.

BACKGROUND OF THE INVENTION

In various applications, it is necessary to bond diamond, polycrystalline diamond compacts, or other superabrasives such as polycrystalline cubic boron nitride to a metal or matrix support. An uncoated superabrasive can be mechanically bonded to a matrix by surrounding and partially encapsulating it in the matrix material. However, such mechanical bonding decreases the cutting efficiency of the tool due to the limited exposure of the cutting element, and is prone to loss of the cutting element as the matrix abrades away during use.

Diamonds and polycrystalline diamonds ("PCD"s) have been coated with carbide forming metals in order to assist bonding with supporting matrices by forming chemical bonds there between. For example, diamond has been coated with tungsten to facilitate bonding to a backing such as an infiltrated tungsten carbide matrix as is disclosed in U.S. application Ser. No. 095,054, filed Sept. 15, 1987, assigned to the present assignee and incorporated herein by reference. The coated PCD is typically placed in a mold with a powder or particles of the matrix material. Common matrix materials include, for example, tungsten carbide, cemented tungsten carbide, tungsten powder, iron powder, iron alloy powder or cast tungsten carbide, which is a eutectic of tungsten monocarbide (WC) and ditungsten carbide ($W_2C$). A binder infiltrant, usually a copper based alloy, is melted and infiltrated through the matrix powder at temperatures between 1000°-1200° C. Upon cooling, the infiltrant bonds the matrix particles together and also bonds to the metal coating of the PCD. The binder typically occupies 30-50% by volume of the matrix.

It has been found that many metal coated PCD's bonded to infiltrated matrices have exhibited cracking at the diamond-coating interface and within the body of the PCD. It is believed that this is caused by the stress between the PCD and the infiltrated matrix body which occurs during cooling as a result of the different thermal expansion rates of the PCD and the matrix. Such cracks are typically parallel to the PCD-matrix interface and in some cases may include said interface. These cracks can later intersect with cracks caused by the stresses of actual use, thereby resulting in the premature loss of the PCD in the field.

A micrograph of a prior art tungsten coated PCD bonded to a matrix support is shown in FIG. 1. In particular, FIG. 1 shows a GE 2164 polycrystalline diamond 31, produced by the General Electric Co. under the trademark "Geoset", having a CVD applied tungsten coating which is 10 microns thick. Cracking is particularly a problem with larger size porous temperature stable PCD's ("TSPCD's") such as the GE 2164. The TSPCD 31 was infiltration-bonded to a cast tungsten carbide matrix using a copper based infiltration alloy having a solidus temperature of 1650° F. (900° C.).

A thermally induced crack 29, shown in FIG. 1, is illustrative of the type of cracking which can occur during cooling after a metal coated PCD is bonded to a matrix.

The differential shrinkage occurring during this cooling process has been estimated. A typical matrix consisting of cast tungsten carbide powder and a copper based alloy shrinks $10 \times 10^{-3}$ in./in. in cooling to room temperature from a solidus of 1650° F. The diamond shrinks an estimated $2.7 \times 10^{-3}$ in./in. The difference between these is $7.3 \times 10^{-3}$ in./in. or approximately 0.7%. Therefore, it is believed that differential shrinkage values of less than approximately 0.7% are required to prevent cracking upon cooling after the PCD has been bonded to the matrix. In accordance with the present invention, polycrystalline diamond and other superabrasive or wear-resistant materials are coated with multiple metal layers in order to prevent such cracking.

SUMMARY OF INVENTION

To avoid such thermally induced cracks and to further improve upon the metal coated products of the prior art, and in particular the metal coated diamond products of the prior art, there is provided in accordance with the present invention a PCD or other superabrasive or wear-resistant material having multiple coatings including an inner metal layer which is compatible with the PCD, a compliant layer coating of a ductile metal or alloy to absorb thermally induced stress, and an outer metal layer of refractory metal or alloy.

It has been discovered that when such a coated PCD is bonded either to a binder alloy which is part of a matrix backing or to certain brazing alloys, thermal induced cracking does not occur upon cooling.

In accordance with another embodiment of the present invention, additional metal layers may be included between the inner layer-compliant layer interface or between the compliant layer-outer layer interface or both to improve bonding therebetween.

In accordance with another aspect of the present invention, a low temperature infiltrant may advantageously be used in bonding the coated PCD to a matrix backing, thereby reducing the effect of any difference in thermal expansion upon cooling.

DETAILED DESCRIPTION OF THE INVENTION

Figure 2:
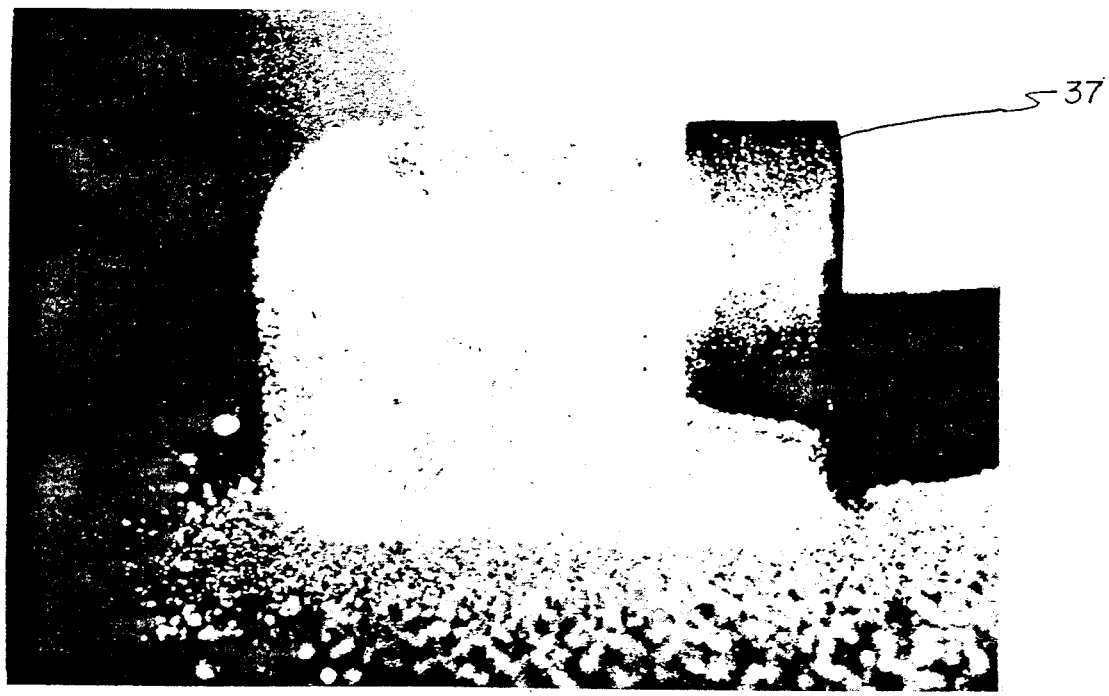
FIG. 2 is a photomicrograph of a diamond product coated in accordance with the present invention and bonded to a matrix support.

FIG. 2 shows a PCD 37 coated with multiple layers in accordance with one embodiment of the present invention. In particular, FIG. 2 is a photomicrograph of a GE 2164 PCD having multiple layers coated thereon, including a 15 micron tungsten layer, a 2 micron nickel layer, a 14 micron copper layer, a 2 micron nickel layer, and an 11 micron tungsten layer. In accordance with this embodiment of the invention, the PCD shown in FIG. 2 was infiltration-bonded to a cast tungsten carbide matrix using a copper based infiltration alloy having a solidus of approximately 1530° F. (835° C.). In accordance with other embodiments of the present invention, the multilayered coated PCD may include solid or sintered supports. The absence of cracking in the PCD shown in FIG. 2 is apparent thereby illustrating the important advantages of the present invention over the prior art techniques.

Figure 4:
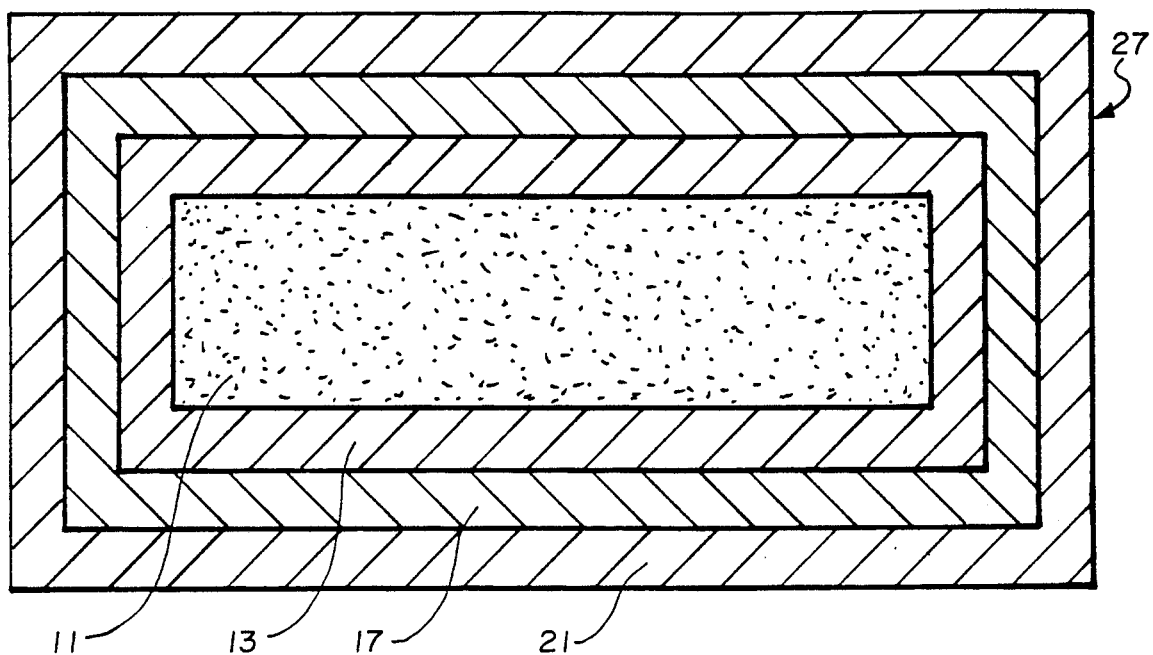
FIG. 4 is a schematic cross-sectional view through the center of a coated product comprising polycrystalline diamond coated with multiple metal layers in accordance with the present invention. The thickness of the coatings are exaggerated for ease of illustration.

Referring to FIG. 4 of the drawings, coated element 27 comprises a coated polycrystalline diamond in accordance with one embodiment of the present invention. As used herein, the term polycrystalline diamond includes polycrystalline diamond-like materials. In accordance with this embodiment of the invention, the substrate material, PCD 11, is coated with multiple metal layers, including an inner layer 13, a compliant layer 17, and an outer layer 21. Coated element 27 may be formed with substrate materials other than polycrystalline diamond. In particular, the substrate material can be single crystal or non-porous diamond, polycrystalline cubic boron nitride, boron carbide, or other cutting or superabrasive or wear-resistant materials such as silicon carbide, alumina and other oxides, carbides, borides, nitrides, etc. or combinations thereof.

PCD 11 can be a commercially available PCD such as those sold by General Electric under the name "Geoset". The PCD 11 is preferably thermally stable at temperatures up to approximately 1200° C. Such PCD's are referred to as the thermally stable PCD's ("TSPCD's"). One commonly used TSPCD is GE's 2164, which is a fine grained compact available in the shape of a disc 5 mm in diameter and 2.5 mm in thickness. PCD's of larger or different shapes may also be used. For example, PCD's are available in the form of triangles, such as GE 2102 and GE 2103.

Inner layer 13 consists of a metal having thermal expansion characteristics which preferably are similar to PCD 11. Inner layer 13 should have a high melting point and not react excessively with PCD 11. Inner layer 13 should consist of a carbide forming metal, thereby allowing for some reaction of inner layer 13 with PCD 11 to form a chemical bond to improve bonding between layer 13 and PCD 11.

In accordance with this embodiment, tungsten is the most preferred metal for forming inner layer 13 because its thermal expansion characteristics are close to that of diamond, it has a high melting point, and it is a good carbide former. Molybdenum and tantalum are other preferred metals for forming inner layer 13 for similar reasons. Other carbide forming metals which can be used include the other Group IVB, VB or VIB metals.

In other embodiments of the present invention, the substrate material used to form coated element 27 may comprise materials other than PCD such as other superabrasives or wear-resistant materials or single crystal or non-porous diamond. In such embodiments, the inner layer 13 metal preferably should consist of a refractory metal or alloy. The selection of the preferred inner layer 13 metal will depend upon compatibility of the thermal expansion characteristics and the reactivity of the inner layer metal and the material forming the coated element 27. For instance, if the superabrasive is a CBN compact, the inner metal layer should consist of metals or alloys from group IVB, VB, VIB, VIIB, or VIIIB, or boride or nitride formers. Titanium or chromium are the preferred metals for forming inner layer 13 if the substrate material is single crystal or non-porous diamond.

Inner layer 13 should be at least 3 microns thick and preferably between about 10-20 microns. A coating of at least 10 microns is preferred in order to facilitate penetration of the coating into the near-surface porosity. Such penetration can substantially improve bonding of coating 13 to PCD 11. Coatings greater than 20 microns can be used but have no apparent advantage, as demonstrated below in the shear tests of PCD's coated with multiple layers in accordance with the present invention. Tests conducted on multiple coated PCD's having varying inner layer thicknesses of tungsten bonded to a test matrix demonstrate that the maximum bond strength occurs at an inner layer thickness of about 15 microns or greater, where the PCD itself sometimes fractured.

The inner metal layer 13 is followed by a compliant metal layer 17 comprising a ductile metal or alloy. The compliant layer 17 must be ductile enough to absorb much of the thermally induced stress otherwise experienced by the PCD 11 during later processing and must have a high enough melting point that it does not melt during bonding to a backing with a binder alloy. It has been found that if the compliant layer melts during the infiltration step, voids may form in the compliant layer which weaken the bonds to the matrix and the other metal layers. It is believed that these voids are caused by impurities in the compliant layer metal. In addition, the melted metal could flow and later harden in an uneven layer having regions around the PCD where the compliant layer is too thin to adequately absorb the stress. The flow of the compliant layer could also cause the PCD to shift position in relation to the matrix material. It has been found that gold, copper, nickel, silver, and some alloys thereof, possess the requisite properties and are preferred in forming compliant layer 17.

The thickness of the compliant layer 17 is preferably between 20-50 microns. If thicker than 50 microns it may be eroded at an exposed edge by exposure to the environment during use. If less than 20 microns, too much stress may be transferred to the PCD 11, thereby causing it to crack.

Outer layer 21 should comprise a metal or alloy which bonds well with the binder alloy. If the binder alloy is part of a matrix backing, outer layer 21 must have limited solubility in the infiltrant used to bond the coated product 27 to the matrix backing, so that it will be wet thereby, but not be substantially dissolved therein. In addition, the temperature used during bonding should be lower than the melting point of the outer layer metal. The outer layer 21 should preferably be relatively oxidation resistant, although an oxidation sensitive metal can be used if the process of bonding to the matrix is performed in a vacuum or reducing atmosphere. The Group IVB, VB and VIB metals fulfill the above criteria. Tungsten, molybdenum, tantalum and rhenium are the most preferred metals for forming outer layer 21 because they are relatively oxidation resistant, have high melting points (well above that of the binder alloy) and bond well to binder alloys. Tungsten is most preferred because it best meets these criteria.

As with inner layer 13, outer layer 21 is preferably between 10-20 microns thick. Thicker coatings do not significantly improve bond strength and are more subject to erosion in certain applications. Thinner coatings may be penetrated by the binder alloy used to infiltrate and bond matrix 33. Such penetration could produce alloying with the compliant layer and destroy its effectiveness.

Figure 5:
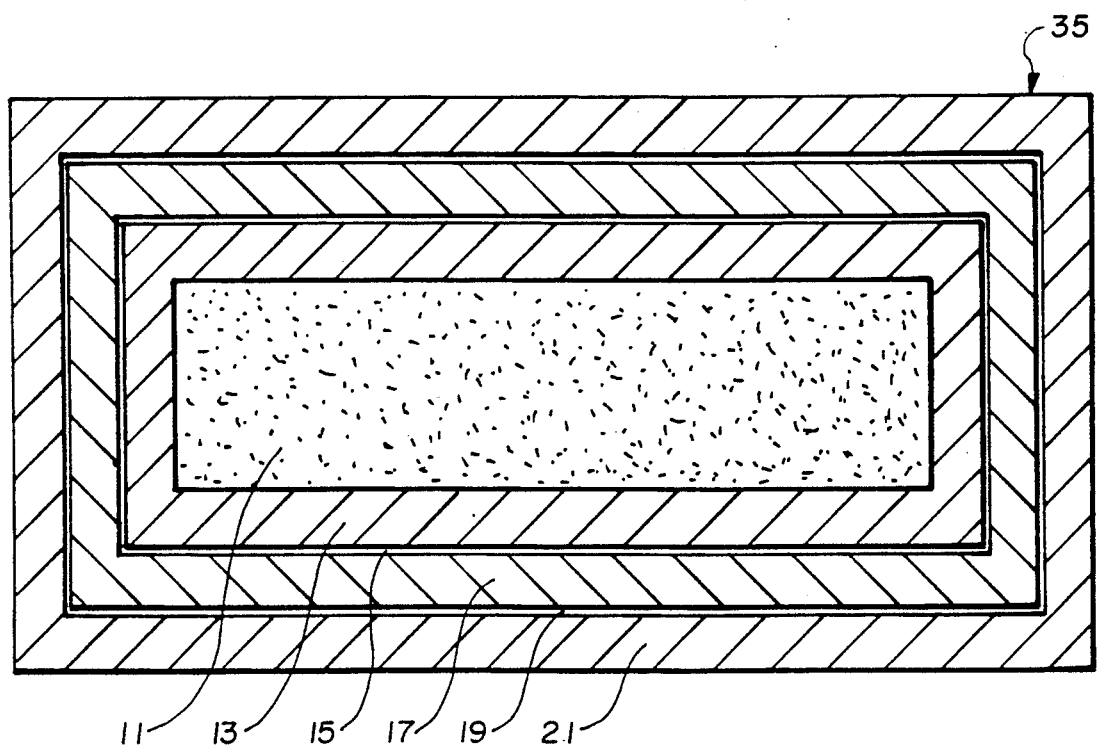
FIG. 5 is a cross-sectional view through the center of another embodiment of a coated product in accordance with the present invention. The thickness of the coatings are again exaggerated for ease of illustration.

The materials selected to form inner layer 13, compliant layer 17, and outer layer 21 may not bond together well. In accordance with a second embodiment of the present invention illustrated in FIG. 5 of the drawings, it may be desirable to include an additional metal layer to enhance bonding between inner layer 13 and compliant layer 17 and/or between compliant layer 17 and outer layer 21. Referring to FIG. 5, PCD 11 is coated with multiple metal layers, including an inner layer 13, a first additional metal layer 15, a compliant layer 17, a second additional metal layer 19, and an outer layer 21 to form coated product 35. Although illustrated here as including additional metal layers 15 and 19, it is contemplated within the present invention that both may not be required and a single additional metal layer may be used.

Figure 3:
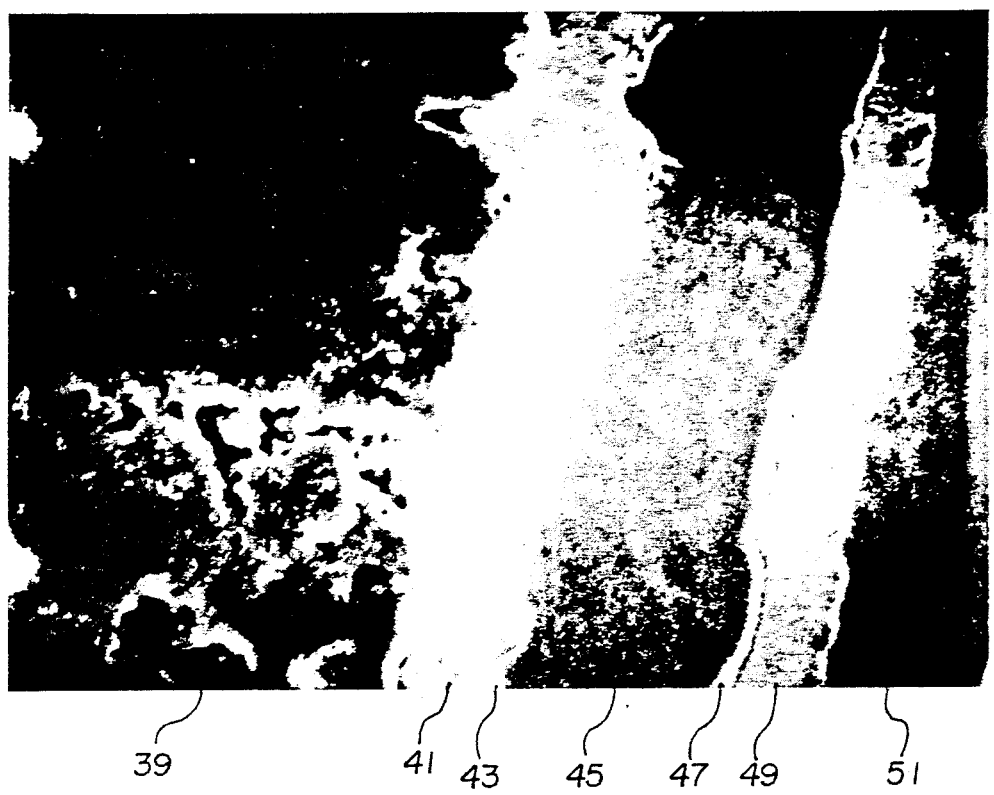
FIG. 3 is a photomicrograph of a PCD coated in accordance with the present invention.

As discussed above, in a preferred embodiment inner layer 13 and outer layer 21 are formed with tungsten and compliant layer 17 is formed with copper. Tungsten and copper are essentially insoluble in each other, and do not bond well. In accordance with this embodiment, additional metal layers 15 and 19 are preferably formed with nickel. Nickel is soluble in tungsten and the other refractory metals and bonds better with them than does copper. Nickel and copper are completely soluble in each other and bond firmly as well. In a preferred embodiment of the present invention, a thin layer of nickel 15 is applied over the inner tungsten layer 13 before the compliant layer 17 is deposited. A second thin nickel layer 19 is applied over the copper compliant layer 17 before the outer layer 21 is deposited. In accordance with this embodiment, the resulting coated product has a PCD-tungsten-nickel-copper-nickel-tungsten layer configuration. FIG. 3 is a photomicrograph (magnification 640X) of such a coated PCD bonded to a support 51. As is shown in FIG. 3, PCD 39 is coated with an inner tungsten layer 41, a first nickel layer 43, a copper layer 45, a second nickel layer 47, and an outer tungsten layer 49. The inner tungsten layer shown in FIG. 3 is 18 microns thick, the nickel-copper-nickel layers combined are 26 microns thick, and the outer tungsten layer is 10 microns thick.

The nickel coatings 15 and 19 are preferably about 1 to 3 microns in thickness. About 1 micron is required to adequately bond with the tungsten layers 13 and 21. A thickness of greater than 3 microns, however, could provide enough nickel to appreciably alloy with the copper compliant layer 17, thereby decreasing its ductility.

The layers 15 and 19 may be formed with other metals including palladium, platinum, cobalt, rhenium and iron. Gold and silver may also be suitable in some conditions. Based on their phase diagrams, these metals should be compatible with tungsten and the other preferred inner and outer layer metals. Ruthenium, iridium or hafnium may be useful as well. Aluminum can be used, but its low melting point makes it unsuitable for use in a coated PCD which is to be bonded to a matrix backing at infiltration temperatures above about 660° C.

Coated products 27 and 35 in accordance with the present invention are made by successive formation of layers onto PCD 11, by known deposition techniques. If inner layer 13 is formed with tungsten, tantalum or molybdenum, it is preferably applied by chemical vapor deposition ("CVD") in a manner known in the art. CVD involves the dissociation of a metal compound, such as tungsten hexafluoride and the subsequent deposition of the metal, in this case tungsten, from a vapor phase onto the PCD 11. CVD is preferred because relatively high rates of deposition can be attained at relatively low temperatures, around 700° C. The process also yields a more uniform coating over the polycrystalline material's entire surface.

If the inner layer 13 is formed with chromium, vanadium, titanium or zirconium, such a layer is preferably applied by metal vapor deposition ("MVD"). MVD involves heating a mixture of the PCD 11 and the metal powder to be applied. The metal evaporates to form a vapor which then deposits on the PCD 11. In metal vapor deposition, the rate of deposition is proportional to the temperature and the metal's vapor pressure. Accordingly, MVD is not the preferred technique for applying metals such as tungsten, tantalum or molybdenum because of their relatively low vapor pressures. For these metals MVD temperatures of about 1000° C. or higher for over 10 hours could be required to deposit the required thickness of the metal. This could seriously degrade the diamond. In addition, it may be difficult to evenly coat the entire surface of a large number of particles. MVD is preferred for applying metals such as chromium, vanadium, titanium or zirconium, because they have relatively high vapor pressures allowing for higher deposition rates at lower temperatures. Other coating methods such as salt bath or sputter coating could also be used.

Compliant layer 17 is preferably applied by electroplate deposition or electroless deposition. In electroplate deposition, described in further detail in the examples below, the PCD 11 having its inner layer 13 coated thereon is placed in an electrolytic solution of the metal to be applied as compliant layer 17. The coated PCD 11 is placed in contact with a cathode. A voltage is applied to the electrodes, which drives the deposition. In electroless deposition, the PCD 11 having an inner layer 13 coated thereon is dipped in a coating solution of the metal to be applied as the compliant layer 17. Electroplate deposition is preferred because it is slightly less expensive and requires less monitoring, and produces a more ductile coating.

If outer layer 21 is tungsten, tantalum or molybdenum it is preferably applied by CVD for the same reasons discussed above for using this method to apply inner layer 13. CVD is also the preferred method because it minimizes damage to the compliant layer. Similarly, if chromium, vanadium, titanium or zirconium are used, MVD would be preferred.

The nickel metal bonding layers 15 and 19 can be "flash coated" by electroplate or electroless deposition, in a manner known in the art, both before and after the compliant layer 17 is applied. Flash coating refers to a coating of a few microns or less. While electroplate deposition is somewhat preferred in applying the nickel to the tungsten and copper layers, electroless coating could be preferred in applying other possible bonding layer metals to other possible inner and compliant layer metals. Sputter coating could also be used to apply metal bonding layers 15 and 19.

Figure 6:
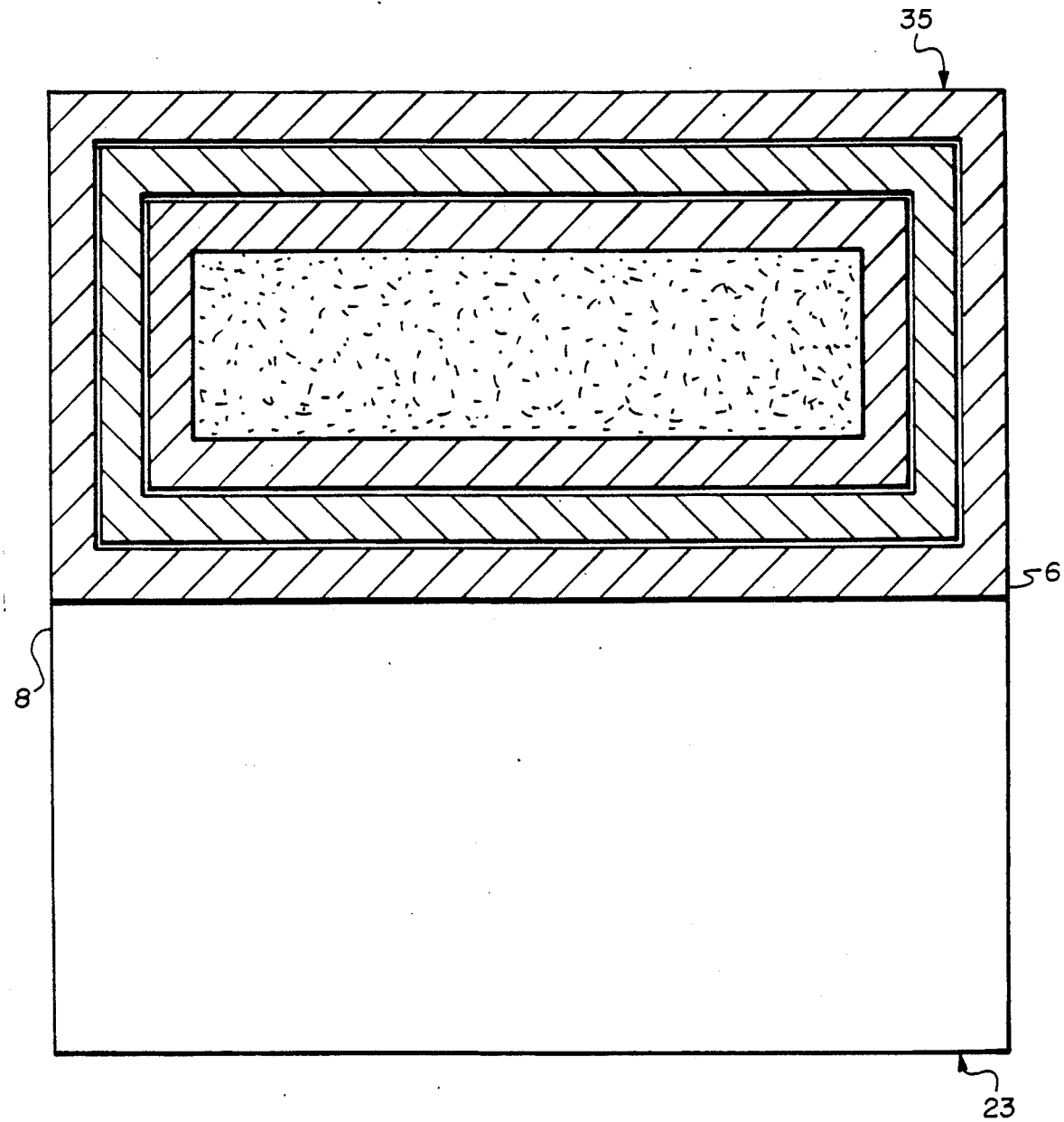
FIG. 6 is a cross-sectional view of a coated product in accordance with the present invention which is bonded to a matrix or support.

FIG. 6 illustrates a coated PCD in accordance with the present invention bonded to a binder alloy 23. In accordance with this embodiment of the invention, the binder alloy is incorporated into a matrix and the coated PCD 35 is bonded during infiltration to the matrix 23 by placing the coated product 35 in a mold having the shape of the desired end product. The matrix material, typically comprising powders of tungsten carbide, cemented or cast tungsten carbide, or iron, is placed in the mold. A binder, typically a copper based alloy, is melted and infiltrated through the matrix powder. The binder must have a low melting point and must wet the outer layer 21. In addition, the binder must be tough, inexpensive, and chemically compatible with the matrix material. The binder occupies approximately 30-50% by volume (20-35% by weight) of the matrix 23. The binder should be infiltrated at a temperature lower than the melting point of the compliant layer 17. Infiltration of a binder metal to form a matrix and to bond with a monolayer coated PCD has usually been conducted between 1100° C.-1200° C. However, in accordance with another aspect of the present invention, infiltrants having melting points below 1000° C. are used and still result in high quality final products.

Presently, one preferred binder is a copper based alloy composed of about 55% copper, about 20% manganese and about 25% zinc by weight. Another preferred alloy comprises about 60% copper, about 20% manganese and about 20% zinc by weight. These compositions are preferred because their melting points are about 835° C., and they can be infiltrated at or below 1070° C. This is lower than the melting point of the preferred copper compliant layer which is about 1080° C. Lower alloy infiltration temperatures also decrease diamond degradation, which can decrease the wear resistance of the coated PCD 35. Using the preferred binder, infiltration can take place at about 1000° C., in 1-3 hours at atmospheric pressure. Use of vacuum or pressure-assisted infiltration is also possible. For very large parts or in molds with low thermal conductivity, longer infiltration times may be required.

Usually, adequate carbide formation between the PCD 11 and the inner layer 13 occurs during the infiltration process. However, a separate heating step can be included that is designed specifically to promote carbide formation.

In an alternate embodiment of this invention, the binder alloy 23 can comprise a braze metal to enable the coated PCD to be bonded to a matrix or other support by brazing. The braze is typically a copper, silver, gold or nickel based alloy. Typical brazing temperature is about 700°-1000° C. At the lower end of this temperature range, there is less thermal stress between the PCD and the matrix upon cooling, and a single tungsten coating layer may be sufficient. However, near the upper end of this range the multilayer metal coated PCD of the present invention is advantageous to avoid thermally induced cracking.

If the coated abrasive element is attached to a backing by brazing, and the brazing temperature is relatively low (below about 900° C.), and the brazing time is relatively short (less than a few minutes) it may not be necessary to include an outer layer 21 since the compliant layer 17 will not be significantly affected by the brazing process. In accordance with this embodiment of the invention, a pre-placed braze should be used for attaching the coated abrasive element. Preferably silver or a silver based alloy is used as the brazing material, however other low temperature brazing materials may be used.

Figure 7:
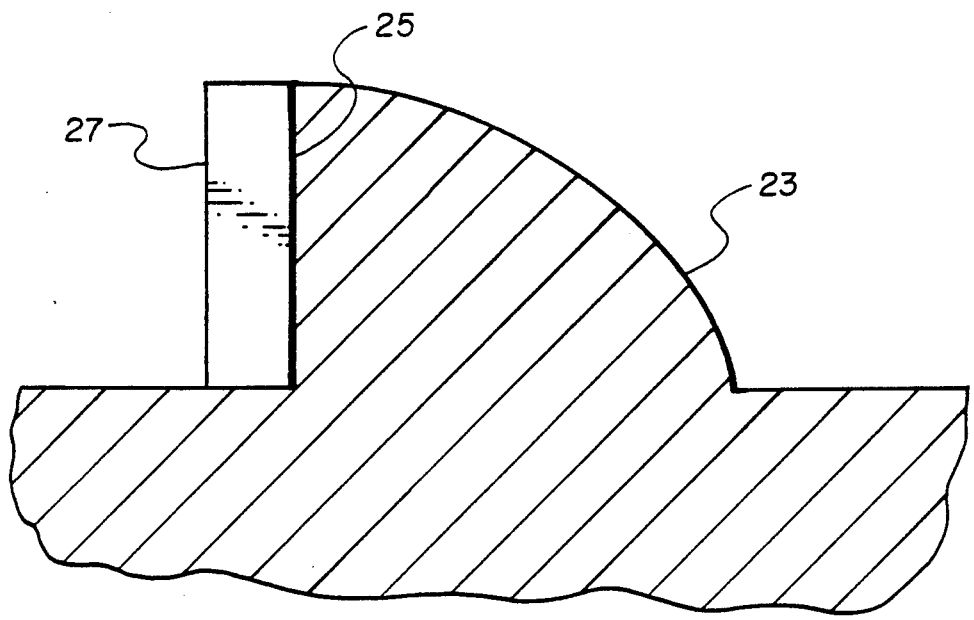
FIG. 7 is a side view of a single cutter of a drill bit incorporating the multilayered coated product of the present invention.
Figure 8:
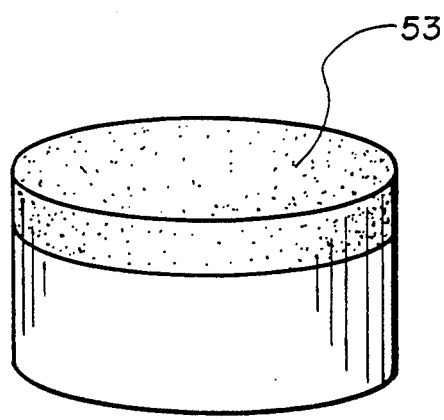
FIG. 8 is a perspective view of a cutting tool incorporating the multilayered coated product of the present invention.

The multilayered coated element described herein may be used to form various cutting devices or abrasive devices. In particular, it can be used to form cutting tools, grinding or lapping tools, as well as drill bits including matrix bits or mosaic cutters. FIG. 8 illustrates a cutting tool incorporating the multilayered coated product 53 of the present invention. A cutting tool can be formed by attaching the multilayered coated element made in accordance with the present invention to a backing by means of brazing to a support or by forming a matrix backing directly onto the coated element. The multilayered coated product 27 or 35 of the present invention may be used in making earth boring bits, as well as, bits for cutting other materials such as metals, glasses, ceramics, or plastics. FIG. 7 illustrates a single cutter of a drill bit incorporating the multilayered coated product 27. Drill bits having either a matrix or steel body can be formed by brazing the multilayered coated element made in accordance with the present invention to a cemented tungsten carbide support which is then pressed or brazed to a bit. A mosaic cutter, which is a closely packed assembly of a plurality of cutters, can be formed by placing a plurality of multilayered coated cutters made in accordance with the present invention into a mold assembly along with a matrix powder. A binder infiltrant is then melted and infiltrated through the matrix powder. Upon cooling, the infiltrant bonds the matrix particles together and also bonds to the metal coatings of the multilayered coated cutters.

The following examples are presented to illustrate the products and processes of the present invention, and are not intended in any way to limit the invention disclosed herein.

EXAMPLE 1

GE 2164 temperature stable PCD's were cleaned by soaking in a 50% aqueous solution of 10 parts hydrofluoric acid (HF) and 1 part nitric acid ($HNO_3$) for 15 minutes (time) at 20° C. The PCD's were then rinsed with water and cleaned with a base by heating to about 60° C. in a 5% aqueous solution of sodium hydroxide (NaOH). After rinsing with water and drying, the PCD's were cleaned in hydrogen gas at 900° C. for 30 minutes at a pressure of 5 torr to break down any organic contaminants which may have still been present.

The cleaned PCD's were coated with tungsten by CVD in a fluidized bed of a gas mixture of 2% by volume tungsten hexafluoride ($WF_6$), 12% hydrogen, 25% helium, and 60% argon, at 700° C. The pressure was initially 5 torr, and was gradually increased to 10 torr to keep the particles fluidized as they became heavier from the coating. Coating continued for approximately 1 hour. Tungsten coatings approximately 20 microns thick were evenly deposited on the PCD's.

Prior to applying additional metal layers, the tungsten coated particles were cleaned in a hot anodic etch of 20% potassium hydroxide (KOH) at about 50° C. and 2 volts for 2 minutes.

A "flash coat" of nickel was applied by electrolytic deposition using the Woods Nickel Strike Solution in a barrel plater. An electrolytic solution composed of 240 grams of nickel chloride ($NiCl_2.6H_2O$) and 125 cc of hydrochloric acid (HCl) per liter of water was prepared. The temperature of the solution was between 20°-30° C. The tungsten coated PCD's were placed in the bottom of a barrel shaped screen, which was inserted into the electrolyte. A cathode was placed in contact with the PCD's, and the anode was inserted into the solution. The PCD's must be in contact with each other in order to be coated. First 4 volts, and then 6 volts were applied for 10 minutes each, at a current density of approximately 330 amps/$m^2$. The voltage was increased to increase the plating rate. A coating between 1-3 microns of nickel was applied.

The compliant layer of copper was also applied by electrolytic deposition in the barrel plater. The tungsten/nickel coated PCD's were placed in a solution of 250 grams of copper sulfate ($CuSO_4.5H_2O$) and 60 grams of sulfuric acid ($H_2SO_4$) per liter of water. A potential of 3 volts was applied to the electrodes placed in the solution. This coating process was conducted for approximately 2.5 hours, yielding a copper layer approximately 40 microns thick. The deposition rate of copper varied between about 13-20 microns per hour at 3 volts.

An additional nickel "flash coat" was applied in the barrel plater by using the same Woods Nickel Strike Solution. 6 volts was applied for 10 minutes, yielding another nickel coating between 1-3 microns. A final layer of tungsten was then applied as was the first, to a thickness of approximately 16 microns.

EXAMPLE 2

GE 2102 temperature stable PCD's were prepared as in Example 1, varying the application times to apply a first tungsten coating of approximately 19 microns, a combined nickel/copper/nickel coating of about 76 microns, and a second tungsten coating of about 15 microns.

Figure 1:
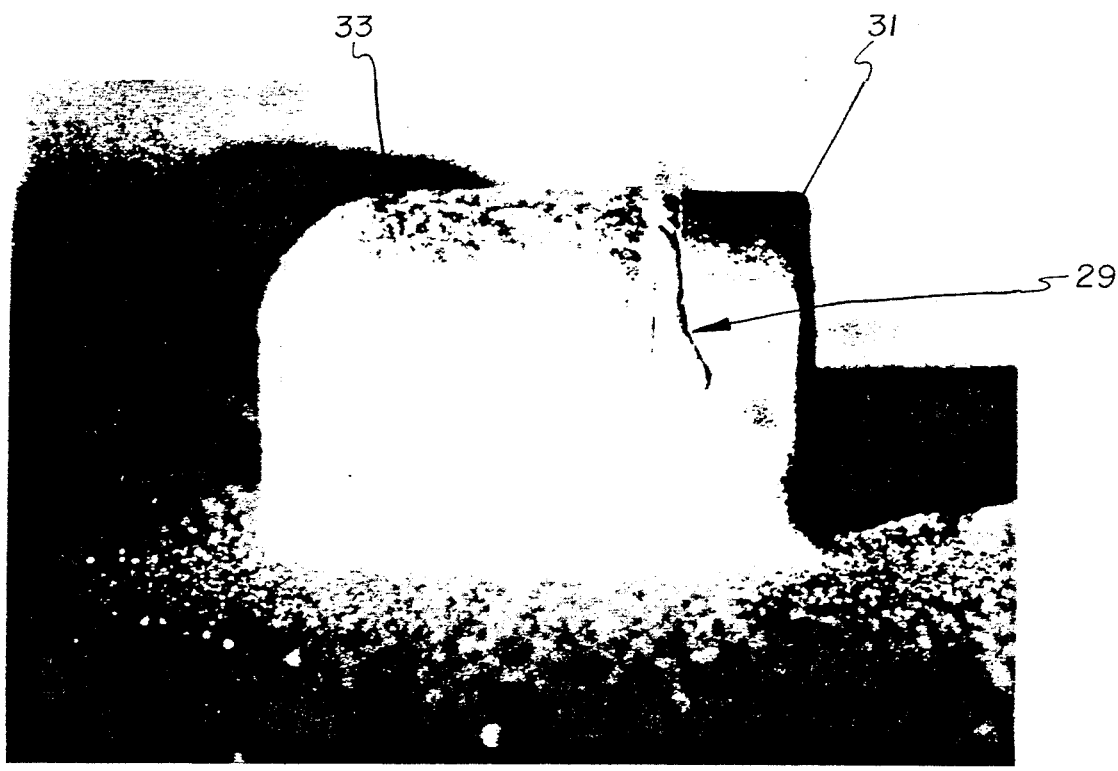
FIG. 1 is a photomicrograph of a prior art tungsten coated PCD bonded to a matrix support showing a thermally induced crack.

To demonstrate that there was less thermally induced cracking when a multilayer metal coated PCD prepared in accordance with the present invention is bonded to a matrix, PCD's coated as in Examples 1 and 2 were bonded to a cylindrical matrix. FIG. 2 shows a multicoated GE 2164 bonded to a matrix support in accordance with the present invention, with the PCD exposed to view. The PCD is bonded to the matrix along its bottom and back surfaces. The PCD's were attached to the matrix by placing the multilayer metal coated PCD in a cylindrical mold with fine grained cast tungsten carbide powder, including 0.2% nickel and 1% boric acid. The nickel assists in the infiltration of the binder and the boric acid dissolves any oxides formed in the matrix powder and facilitates its wetting. The powder was infiltrated with a copper based alloy composed of 55% by weight copper, 20% manganese and 25% zinc at between 1000° C.-1050° C., for 1 hour at atmospheric pressure. After removal from the mold, the PCD was grit blasted to remove the exposed metal layers and examined. PCD's coated with a single layer of tungsten were similarly bonded to a matrix and grit blasted for comparison. An example of a prior art tungsten monolayer coated PCD is shown in FIG. 1. The arrow in FIG. 1 indicates a thermally induced crack in the PCD. The multilayer metal coated PCD of the present invention showed no cracking, as may be seen in FIG. 2, wherein an example of such a PCD is shown.

To test the strength of the PCD-matrix bond, the PCD's bonded to the matrix cylinders were placed in a shear testing apparatus. Increasing loads were applied on one side of the PCD and on one side of the matrix cylinder, but in the opposite directions as is illustrated by arrows 6 and 8 in FIG. 6. The loads were applied near the PCD-matrix interface. Uncoated and monolayer tungsten coated PCD's of varying coating thicknesses were tested for comparison. The uncoated PCD fell out of the matrix, showing no bond strength. The PCD's with tungsten coatings of 30 microns or more showed an average bond strength of 17 ksi, with the fractures occurring mostly within the PCD or at the tungsten-PCD interface. With a thinner tungsten coating, the strength can be lower if the binder alloy penetrates said coating, as often occurs. Two coated PCD's prepared as described in Example 2 also fractured across the PCD, near the matrix, under stresses of 25 and 27 ksi. In the 40 PCD's prepared and tested as in Example 1, bond strengths between 20-24 ksi were demonstrated. One of the samples fractured in the PCD, another fractured through the PCD and matrix, and two sheared through the copper layer. The shear strength of all the samples was sufficient for most high stress applications. It is believed that the ordinary, random variations in the strength of the PCD itself caused the range of test results.

The cracks caused by thermal stress did not manifest themselves by decreased bond strength in the tests described above due to the nature of the test. Thermally induced stress caused by the bonding of the PCD to the matrix appears to result in cracks essentially parallel to the PCD-matrix interface, as shown in FIG. 1. The stress in the shear strength test is applied very close to the interface between the PCD and the matrix. Since the preexisting crack is not between the matrix and the application of the force, it does not cause a premature fracture between the matrix and the PCD. In actual use, however, stresses are applied on all sides and at different locations on the PCD, causing cracks along different angles. Such cracks are more likely to intersect those already present from thermal stress and produce a loss of relatively large portions of the PCD.

We claim:

1. A coated abrasive element for bonding at a surface thereof to a backing by means of a brazing or binder material comprising:
   a substrate material selected from the group consisting of single crystal diamond, polycrystalline diamond, polycrystalline cubic boron nitride, boron carbide, silicon carbide, alumina or combinations thereof;
   an inner layer of a metal or alloy coated on at least a portion of said substrate material, said inner metal layer being capable of reacting with said substrate material to form a bond therebetween;
   a compliant layer of a ductile metal or alloy coated on said inner layer, said compliant layer having a thickness sufficient to substantially prevent cracking of said polycrystalline element caused by the transfer of stress to said polycrystalline element during cooling after said coated abrasive element is bonded to said backing; and an outer layer of a metal or alloy coated on said compliant layer and having a melting point higher than said compliant layer, said outer layer being sufficiently thick so as to be substantially impervious to said brazing or binder material during bonding to said backing.

2. An abrasive element of claim 1, wherein said substrate material is cubic boron nitride and said inner layer metal is selected from the group consisting of metals and alloys of group IVB, VB, VIB, VIIB, and VIIIB elements.

3. An abrasive element of claim 1, wherein said substrate material is single crystal or non-porous diamond and said inner layer metal is selected from the group consisting of titanium and chromium.

4. A coated abrasive element for bonding at a surface thereof to a backing by means of a brazing or binder material comprising:

a polycrystalline element;

an inner layer of a refractory metal or alloy coated on at least a portion of said polycrystalline element;

a compliant layer of a ductile metal or alloy coated on said inner layer, said compliant layer having a thickness sufficient to substantially prevent cracking of said polycrystalline element caused by the transfer of stress to said polycrystalline element during cooling after said coated abrasive element is bonded to said backing; and an outer layer of a metal or alloy coated on said compliant layer and having a melting point higher than said compliant layer, said outer layer being sufficiently thick so as to be substantially impervious to said brazing or binder material during bonding to said backing.

5. An abrasive element of claim 4, wherein said polycrystalline element comprises a material selected from the group consisting of polycrystalline diamond, polycrystalline cubic boron nitride, silicon carbide, alumina and combinations thereof.

6. An abrasive element of claim 4, wherein said compliant layer comprises a material selected from the group consisting of copper, gold, nickel, silver and alloys thereof.

7. An abrasive element of claim 4, wherein said inner layer comprises a material selected from the group consisting of group IVB metals, group VB metals, group VIB metals, group VIIIB metals and alloys thereof.

8. An abrasive element of claim 4, wherein said outer layer comprises a material selected from the group consisting of group IVB metals, group VB metals, group VIB metals, group VIIIB metals and alloys thereof.

9. An abrasive element of claim 4, wherein said inner layer and said outer layer are selected from the group consisting of tungsten, molybdenum, chromium, palladium, vanadium, titanium, zirconium, rhenium, niobium, tantalum and alloys thereof.

10. An abrasive element of claim 4, wherein said inner layer is sufficiently thick so as to substantially cover and seal a surface of said polycrystalline element and remain continuous when said abrasive element is bonded to said backing.

11. An abrasive element of claim 4, wherein said inner layer is at least 3 microns thick.

12. An abrasive element of claim 4, wherein said outer layer is at least 10 microns thick.

13. An abrasive element of claim 4, wherein said compliant layer is at least 10 microns thick.

14. An abrasive element of claim 4, further comprising at least one additional metal layer between said inner layer and said compliant layer or between said outer layer and said compliant layer, said additional metal layer consisting of a metal or metal alloy which is at least partially soluble in the materials which form the layers that are adjacent to said additional metal layer.

15. An abrasive element of claim 14, wherein said additional metal layer comprises nickel.

16. An abrasive element of claim 14, wherein said additional metal layer is at least 1 micron thick.

17. A coated abrasive element for bonding at a surface thereof to a backing by means of a brazing or binder material comprising:

a polycrystalline diamond element;

an inner layer of a carbide forming metal, said inner layer being adjacent to said polycrystalline diamond element and being sufficiently thick so as to substantially cover and seal a surface of said polycrystalline diamond element:

a compliant layer of a ductile metal or alloy coated over said inner layer, said compliant layer being sufficiently thick so as to reduce the transfer of stress to said diamond element for preventing cracking of said diamond element during cooling after said coated abrasive element is bonded to said backing; and an outer layer of a metal or alloy coated over said compliant layer and having a melting point higher than that of said compliant layer, said outer layer being sufficiently thick so as to be substantially impervious during bonding to said binder material.

18. The abrasive element of claim 17, wherein said compliant layer comprises a material selected from the group consisting of copper, gold, nickel, silver and alloys thereof.

19. The abrasive element of claim 17, wherein said inner layer comprises a material selected from the group consisting of group IVB metals, group VB metals, group VIB metals, group VIIIB metals and alloys thereof.

20. The abrasive element of claim 17, wherein said outer layer comprises a material selected from the group consisting of group IVB metals, group VB metals, group VIB metals, group VIIIB metals and alloys thereof.

21. The abrasive element of claim 17, wherein said inner layer metal is selected from the group consisting of tungsten, molybdenum, chromium, vanadium, titanium, zirconium, rhenium, niobium, tantalum and alloys thereof.

22. The abrasive element of claim 17, wherein said outer layer metal is selected from the group consisting of tungsten, molybdenum, chromium, vanadium, titanium, zirconium, rhenium, niobium, tantalum and alloys thereof.

23. The abrasive element of claim 17, further including at least one additional metal layer between said inner layer and said compliant layer or between said outer layer and said compliant layer, said additional metal layer consisting of a metal or metal alloy which is at least partially soluble in the materials which form the layers that are adjacent to said additional metal layer.

24. An abrasive element for bonding at a surface thereof to a backing by means of a brazing or binder material comprising:

a polycrystalline element;

an inner layer of a refractory metal selected from the group consisting of tungsten, molybdenum, chromium, vanadium, titanium, zirconium, rhenium, niobium, tantalum and alloys thereof, said inner layer being coated on a surface of said polycrystalline element and being sufficiently thick so as to substantially cover and seal said surface of said polycrystalline element;

a compliant layer of a refractory metal selected from the group consisting of copper, gold, nickel, silver and alloys thereof, said compliant layer being coated on said inner layer and being sufficiently thick so as to reduce the transfer of stress to said polycrystalline element; and an outer layer of a refractory metal selected from the group consisting of tungsten, molybdenum, chromium, vanadium, titanium, zirconium, rhenium, niobium, tantalum and alloys thereof, said outer layer being sufficiently thick so as to be substantially impervious during bonding to said brazing or binder material; and at least one additional metal layer between said inner layer and said compliant layer or between said outer layer and said compliant layer, said additional metal layer consisting of a metal or metal alloy which is at least partially soluble in the materials which form the layers that are adjacent to said additional metal layer.

25. An abrasive element of claim 24, wherein said inner layer is at least 3 microns thick, said compliant layer is at least 10 microns thick, said outer layer is at least 10 microns thick, and said additional metal layer is at least 1 micron thick.

26. An abrasive element of claim 24, wherein said inner and said outer layers comprise tungsten, said compliant layer comprises copper, and said additional metal layer comprises nickel.

27. A coated abrasive element for bonding at a surface thereof to a backing by means of a brazing material comprising:

a polycrystalline element;

an inner layer consisting of tungsten coated on at least a portion of said polycrystalline element;

a compliant layer consisting of copper coated on said inner layer, said compliant layer having a thickness sufficient to substantially prevent cracking of said polycrystalline element caused by the transfer of stress to said polycrystalline element during cooling after said coated abrasive element is bonded to said backing.

28. A matrix bit comprising an abrasive element bonded to a matrix backing, wherein said abrasive element comprises a polycrystalline diamond element having a plurality of layers which coat a portion thereof, including an inner layer of a carbide forming metal adjacent to said polycrystalline diamond element, said inner layer being at least 3 microns thick; a compliant layer of a ductile metal or alloy, said compliant layer being at least 10 microns thick; and an outer layer of a metal or alloy with a melting point higher than said compliant layer, said outer layer being at least 10 microns thick; and said compliant layer being located between said outer layer and said inner layer.

29. A cutting tool comprising an abrasive element bonded to a matrix backing, wherein said abrasive element comprises polycrystalline diamond element having a plurality of layers which coat a portion thereof, including an inner layer of a carbide forming metal adjacent to said polycrystalline diamond, said inner layer being at least 3 microns thick; a compliant layer of a ductile metal or alloy, said compliant layer being at least 10 microns thick; and an outer layer of a metal or alloy with a melting point higher than said compliant layer, said outer layer being at least 10 microns thick; and said compliant layer being located between said outer layer and said inner layer.

30. A method of forming a matrix backing onto a tungsten coated polycrystalline diamond abrasive element including the steps of:

placing said abrasive element and a matrix forming metal powder in a mold, said matrix forming metal powder being selected from a group consisting of tungsten carbide, cemented tungsten carbide, iron powder, tungsten powder and cast tungsten carbide;

melting and infiltrating a binder infiltrant through said matrix forming metal powder at a temperature below 1070° C., said binder comprising a copper based alloy composed of about 55-60% by weight copper, about 20% by weight manganese and about 20-25% by weight of zinc.

31. A method of forming a matrix backing onto a multicoated abrasive element including the steps of:

forming a multicoated abrasive element by applying an inner metal layer to a polycrystalline diamond element, said inner metal layer consisting of a carbide forming metal; applying a compliant metal layer on said inner metal layer, said compliant layer consisting of a ductile metal or alloy; applying an outer metal layer on said compliant layer, said outer metal layer consisting of a refractory metal or alloy;

placing said multicoated abrasive element and a matrix forming metal powder in a mold, said matrix forming metal powder being selected from a group consisting of tungsten carbide, cemented tungsten carbide, tungsten powder, iron powder, and cast tungsten carbide;

melting and infiltrating a binder infiltrant through said matrix forming metal powder at a temperature below 1070° C., said binder comprising a copper based alloy composed of about 55-60% by weight copper, about 20% by weight manganese and about 20-25% by weight of zinc.

32. The method of claim 31, wherein said compliant layer comprises a material selected from the group consisting of copper, gold, nickel, silver and alloys thereof.

33. The method of claim 31, wherein said inner layer comprises a material selected from the group consisting of group IVB metals, group VB metals, group VIB metals, group VIIIB metals and alloys thereof.

34. The method of claim 31, wherein said outer layer comprises a material selected from the group consisting of group IVB metals, group VB metals, group VIB metals, group VIIIB metals and alloys thereof.

35. The method of claim 31, wherein said inner layer comprises a material selected from the group consisting of tungsten, molybdenum, chromium, vanadium, tantalum, palladium, rhenium, titanium, zirconium, niobium, tantalum and alloys thereof.

36. The method of claim 31, wherein said outer layer comprises a material selected from the group consisting of tungsten, molybdenum, chromium, vanadium, titanium, tantalum, palladium, rhenium, zirconium, niobium, tantalum and alloys thereof.

37. The method of claim 31, wherein said inner layer is formed by chemical vapor deposition, said compliant layer is formed by electroplate deposition, and said outer metal layer is formed by chemical vapor deposition.

38. A method of forming a matrix backing onto a multicoated abrasive element including the steps of:

forming a multicoated abrasive element by applying an inner metal layer to a polycrystalline element, said inner layer metal being selected from the group consisting of tungsten, tantalum or molybdenum; applying to said inner metal layer a compliant metal layer consisting of a material selected from the group consisting of gold, copper, nickel, silver and alloys thereof; applying an outer metal layer on said compliant layer, said outer metal layer consisting of a metal selected from the group consisting of tungsten, tantalum, molybdenum, and alloys thereof;

placing said multicoated abrasive element and a matrix forming metal powder in a mold, said matrix forming metal powder being selected from a group consisting of tungsten carbide, cemented tungsten carbide, tungsten powder, iron powder, and cast tungsten carbide;

melting and infiltrating a binder infiltrant through said matrix forming metal powder at a temperature below 1070° C., said binder comprising a copper based alloy composed of about 55% to 60% by weight copper, about 20% by weight manganese and about 20% to 25% by weight of zinc.

39. The method of claim 38, wherein said inner layer is formed by chemical vapor deposition, said compliant layer is formed by electroplate deposition, and said outer metal layer is formed by chemical vapor deposition.

40. A method of forming an abrasive tool including the step of brazing a coated abrasive element to a support at a temperature between 600°-1070° C., wherein the braze is an alloy whose metal base is selected from the group consisting of copper, silver, gold or nickel, and said coated abrasive element comprises a polycrystalline diamond element having a plurality of layers which coat a portion thereof, including an inner layer of a metal selected from the group consisting of tungsten, molybdenum, chromium, vanadium, titanium, zirconium, niobium, tantalum, and alloys thereof, said inner layer being adjacent to said polycrystalline diamond and being at least 3 microns thick; an outer layer of a metal selected from the group consisting of tungsten, molybdenum, chromium, vanadium, titanium, zirconium, rhenium, niobium, tantalum, and alloys thereof, said outer layer being at least 10 microns thick; and a compliant layer of a ductile material selected from the group consisting of copper, gold, nickel, silver and alloys thereof; said compliant layer being located between said outer layer and said inner layer and being at least 10 microns thick.

41. A method of forming an abrasive tool including the step of attaching a coated abrasive element to a support by means of brazing said coated abrasive element to said support at a temperature of less than 900° C., wherein said coated abrasive element comprises a polycrystalline diamond element having a plurality of layers which coat a portion thereof, including an inner layer of a metal selected from the group consisting of tungsten, molybdenum, chromium, vanadium, titanium, zirconium, niobium, tantalum, and alloys thereof, said inner layer being adjacent to said polycrystalline diamond and being at least 3 microns thick, and a compliant layer of a ductile material selected from the group consisting of copper, gold, nickel, silver and alloys thereof, said compliant layer being adjacent to said inner layer and being at least 10 microns thick.

42. The method of claim 41, wherein said brazing is done with a brazing material comprising silver or a silver based alloy.

43. A method of forming a mosaic cutter comprising the steps of:

placing a plurality of coated cutters into a mold assembly;

placing a matrix powder into said mold over at least a portion of said plurality of cutters; and melting and infiltrating a binder infiltrant through said matrix powder, thereby bonding said matrix powder to said coated cutters;

wherein said coated cutters comprise a polycrystalline diamond substrate, an inner layer of a carbide forming metal or alloy coated on at least a portion of said polycrystalline diamond, a compliant layer of a ductile metal or alloy coated on said inner layer, said compliant layer having a thickness sufficient to substantially prevent cracking of said polycrystalline diamond caused by the transfer of stress to said polycrystalline diamond during cooling after said infiltration, and an outer layer of a metal or alloy coated on said compliant layer and having a melting point higher than said compliant layer, said outer layer being sufficiently thick so as to be substantially impervious to said binder infiltrant.

44. A method of forming a drill bit comprising the steps of:

brazing a coated element to a cemented tungsten carbide support; and attaching said support to a bit;

wherein, said coated element comprises a polycrystalline diamond substrate, an inner layer of a carbide forming metal or alloy coated on at least a portion of said polycrystalline diamond, a compliant layer of a ductile metal or alloy coated on said inner layer, said compliant layer having a thickness sufficient to substantially prevent cracking of said polycrystalline diamond caused by the transfer of stress to said polycrystalline diamond during cooling after said infiltration, and an outer layer of a metal or alloy coated on said compliant layer and having a melting point higher than said compliant layer, said outer layer being sufficiently thick so as to be substantially impervious to said binder infiltrant.

* * * * *